United States Patent

[11] 3,622,460

[72] Inventors: Kazuo Masuda, Okayam-shi, Okayama; Masakazu Mitsuhashi, Okayama-shi, Okayama; Mamoru Hirao, Setocho, Akaiwa-gun, Okayama; Yoshinori Sato, Okayama-shi, Okayama; Kaname Sugimoto, Okayama-shi, Okayama, all of Japan
[21] Appl. No.: 733,325
[22] Filed: May 31, 1968
[45] Patented: Nov. 23, 1971
[73] Assignee: Hayashibara Co. Okayama-shi, Okayama, Japan
[32] Priority: June 1, 1967
[33] Japan
[31] 42/34468

[54] PROCESS FOR PRODUCING A LARGE AMOUNT OF ISOAMYLASE
2 Claims, No Drawings

[52] U.S. Cl. ................................... 195/66 R, 195/31 R
[51] Int. Cl. ..................................... C12d 13/00
[50] Field of Search ........................... 195/62, 66, 31

[56] References Cited
UNITED STATES PATENTS
3,490,995   1/1970   Wallentels et al. ........... 195/66

OTHER REFERENCES
Wallentels et al., Biochemical and Biophysical Research Communications Vol. 22 No. 3 pg. 254–261 (1966).

Primary Examiner—Lionel M. Shapiro
Attorneys—Alvin Browdy and Sheridan Neimark

ABSTRACT: According to the present invention, a strain of *Aerobacter aerogenes* is engaged in a preliminary culture upon a streak culture and then one platinum loop of the resulting seed culture is inoculated into a liquid medium sterilized as usual, which medium contains ammonium salt as a nitrogen source and liquefied starch as a carbon source, and is cultured under the condition of pH 5–8 to produce a large amount of isoamylase.

PROCESS FOR PRODUCING A LARGE AMOUNT OF ISOAMYLASE

This invention relates to a process of producing a large amount of isoamylase. More particularly, this invention relates to a method of producing isoamylase by the culture of the organism producing isoamylase upon a culture medium, which consists of ammonium salts as nitrogen source and liquefied starch as carbon source, to produce and accumulate a large amount of isoamylase in the culture medium.

Isoamylase is an enzyme which catalyzes to specifically hydrolyze alpha-1.6-linkage at the branched position of starch.

It was reported by Bender et al. in 1961 that isoamylase (they named this as pullulanase could be obtained by the method of the culture of a strain of *Aerobacter aerogenes*.

Bender et al. reported that an enzyme solution with high activity was produced by the culture of using a culture medium which contains inorganic or organic nitrogen as nitrogen source and the enzyme as an induction enzyme, being especially inducted with maltose, maltotriose and pullulan.

The present inventors concentrated their efforts in paying attention to the substrate specificity of the isoamylase, in the search of an industrial method for producing a large amount of isoamylase. As the result, it has been found that when using liquefied starch as the carbon source and ammonium salts as the nitrogen source a large amount of isoamylase may be produced and accumulated in the culture medium.

An object of the present invention is to provide an isoamylase which has high activity.

A further object of the present invention is to provide a novel process for producing a large amount of isoamylase by the culture of *Aerobacter aerogenes*.

A still further object of the present invention is to produce an isoamylase with a high degree of activity in a simple and efficient manner in high yield.

The present invention will be more fully described hereunder following some experimental examples.

Bender et al. reported that the culture medium of the composition given in the following tables 1 and 2 Aerobactor inoculated with *Aerobactor aerogenes* and the strain cultured to produce from 10 to 20 units/ml. of isoamylase (also named pullulanase) produced in the culture. But this method isn't satisfactory for industrial purposes.

| Table 1 | | Table 2 | |
|---|---|---|---|
| Na NO$_3$ | 0.3% | Na NO$_3$ | 0.5% |
| K$_2$HPO$_4$ | 0.1% | Peptone | 0.8% |
| MgSO$_4$·H$_2$O | 0.05% | K$_2$HPO$_4$ | 0.1% |
| KCL | 0.05% | Mg SO$_4$·7H$_2$O | 0.05% |
| Fe SO$_4$·7H$_2$O | 0.001% | KCl | 0.05% |
| Maltose | 0.8% | Fe SO$_4$·7H$_2$O | 0.001% |
| | | Maltose | 0.5% |

The determination of enzyme activity shown hereunder was conducted as follows:

| A reaction mixture consisting of enzyme solution | 1 ml. |
|---|---|
| 1% soluble glutinous rice starch solution | 5 ml. |
| 0.5M acetate buffer solution | 1 ml. | of pH 6.0 was incubated at 40° C. for 30 minutes.

0.5 ml. of the reaction mixture was withdrawn and mixed with 0.5 ml. of 0.01M iodine solution and 15 ml. of water. After 15 minutes the absorbency at a wavelength of 610M was determined and the enzyme activity for altering the absorbency by 0.1 was deemed as 10 units.

Notes: one unit given of the enzyme activity corresponds to 2.5 units of the unit shown in the specification of Japanese patent application Ser. No. 34867/67.

EXPERIMENT 1

A streak culture medium composed of

| Peptone | 1.0% |
|---|---|
| Yeast extract | 0.5% |
| Mg SO$_4$·7H$_2$O | 0.05% |
| KCl | 0.05% |
| Fe SO$_4$·7H$_2$O | 0.001% |
| Maltose | 1.0% | is inoculated with *Aerobacter aerogenes* and the strain is cultured for 20 hours (this culture is used in this experiment as a seed culture as well as in the experiments and examples hereafter).

A medium composed of

| (NH$_4$)$_2$SO$_4$ | 0.4% |
|---|---|
| K$_2$H PO$_4$ | 0.7% |
| KH$_2$PO$_4$ | 0.3% |
| Mg SO$_4$·7H$_2$O | 0.05% |
| KCl | 0.05% |
| Fe SO$_4$·7H$_2$O | 0.001% |
| Maltose, soluble starch or liquefied starch | 1.4% | which was poured into a 500 ml. conical flask and sterilized as usual was inoculated with one platinum loop of the resulting seed culture and the charge was then cultured at 30° C. for 40 hours. Thereafter pH, absorbency and enzyme activity of the resulting solution obtained were determined. The results are tabulated in the following table.

TABLE 3

Transition of Isoamylase Activity with Carbon Sources

| Carbohydrate used as substrate | pH | Absorbency | Enzyme activity (unit/ml.) |
|---|---|---|---|
| Soluble starch | 7.80 | 0.500 | 35 |
| Maltose | 6.90 | 0.570 | 39 |
| Liquified starch | 7.70 | 0.520 | 138 |

Notes: The liquefied starch refers to a solution wherein a commercially available liquefying enzyme (alpha-amylase) was added to a potato starch emulsion to be treated and the pH of it was adjusted to about 6 and continuously liquified at 88° C.

As the results from table 3 show it has been found that the use of liquefied starch in the culture medium is obviously successful for producing an amylase.

EXPERIMENT 2

The following culture media A, B and C, each of which have different nitrogen sources, were cultured in the same manner as described in experiment 1. However, the pH of culture medium C was adjusted to 3 with alkali.

Culture medium A

| Peptone | 1.0% |
|---|---|
| Yeast extract | 0.5% |
| Mg SO$_4$·7H$_2$O | 0.05% |
| KCl | 0.05% |
| Fe SO$_4$·7H$_2$O | 0.001% |
| Liquified starch | 1% |

Culture medium B

| Corn steep liquor | 3% |
|---|---|
| Mg SO$_4$·7H$_2$O | 0.05% |
| KCl | 0.05% |
| Fe SO$_4$·7H$_2$O | 0.001% |
| Liquefied starch | 1.0% |

Culture medium C

| NH$_4$NO$_3$ | 0.48% |
|---|---|
| K$_2$HPO$_4$ | 0.7% |

| | |
|---|---|
| KH PO | 0.3% |
| MgSO₄·7H₂O | 0.05% |
| KCl | 0.05% |
| Fe SO₄·7H₂O | 0.001% |
| Liquified starch | 1.0% |

TABLE 4

Transition of Isoamylase Activity with different nitrogen sources

| Nitrogen sources in culture medium | pH | Absorbency | Enzyme activity (unit/ml.) |
|---|---|---|---|
| Culture medium A | 7.65 | 0.440 | 40 |
| Culture medium B | 8.40 | 0.400 | 25 |
| Culture medium C | 7.00 | 0.365 | 70 |

EXPERIMENT 3

In the method described in experiment 1, after changing the kinds of nitrogen source and the mount used in culture medium (1.4 percent of liquified starch is used as carbon source), the materials to be treated were cultured at 30° C. for 25 hours.

TABLE 5

Influence of nitrogen sources and its concentration on isoamylase activity

| Nitrogen source | Amount used, percent | pH | Absorbency | Enzyme activity (unit/ml.) |
|---|---|---|---|---|
| Urea | 0.172 | 7.40 | 0.015 | 0 |
| Do | 0.344 | 7.45 | 0.017 | 0 |
| Corn steep liquor | 3.0 | 6.45 | 0.325 | 5 |
| NaNO₃ | 0.485 | 7.20 | 0.015 | 0 |
| NaNO₃ | 0.970 | 6.98 | 0.120 | 2 |
| NH₄NO₃ | 0.230 | 6.82 | 0.400 | 5 |
| NH₄NO₃ | 0.460 | 6.75 | 0.420 | 20 |
| NH₄NO₃ | 0.920 | 6.48 | 0.530 | 20 |
| (NH₄)₂HPO₄* | 0.40 | 6.0 | 0.210 | 30 |
| Ammonium acetate* | 0.60 | 8.8 | 0.222 | 80 |

*Indicates when periods of the culture are 72 hours.

According to the results shown in tables 4 and 5, it has been found that an enzyme with high activity may be produced when using ammonium salts as the nitrogen source in the culture medium. The ammonium salts that can be used for the production and the accumulation of isoamylase include inorganic ammonium slats such as ammonium nitrate, ammonium sulfate, ammonium phosphate, ammonium chloride and organic ammonium salts such as ammonium acetate.

In order to carry out the present invention, it is desirable to employ a liquified starch with liquefaction ratio from 5 to 10 percent as the carbon source and the amount used in the culture medium is preferably from 1 to 3 percent. These matters may be determined from the results of experiment 4 and 5 described hereafter.

EXPERIMENT 4

0.48 percent of NH₄NO₃ instead of the (NH₄)₂SO₄ in experiment 1 was used as the nitrogen source in the culture medium and 1.4 percent of liquified starches which have different liquefaction ratios were used as the carbon source.

The culture was conducted by the same method as described in experiment 1. The temperature for the culture was 30° C. and the period was for 55 hours. The results are as shown in table 6.

TABLE 6

Relations between D.E. (dextrose equivalent) of liquified starch and the isoamylase activity

| D.E. of liquified starch used | pH | Absorbency | Enzyme activity (unit/ml.) |
|---|---|---|---|
| 3.5 | 7.70 | 0.380 | 25 |
| 5.7 | 7.90 | 0.400 | 100 |
| 7.2 | 8.40 | 0.410 | 100 |
| 12.0 | 8.01 | 0.555 | 50 |
| 16.0 | 7.60 | 0.560 | 40 |

The results from table 6 show that it is preferred to use liquified starch with from about 5 to about 10 D.E. as the carbon source in the culture medium to produce isoamylase.

Bender et al. also reported that when using maltose as the carbon source, the isoamylase activity increased until 0.8 percent of the maltose was used. However, it may be found from the results in experiment 5 that when using liquified starch as the carbon source, the isoamylase activity increases until 1.4 percent of the liquified starch is used and it is suitable to use from 1 to 3 percent of the liquified starch.

EXPERIMENT 5

Following the method of experiment 1, the results as shown in table 7 were obtained. Liquified starch was used as the carbon source.

TABLE 7

Relations between the amount added of liquified starch and activity of isoamylase obtained

| The amount used of liquified starch | Absorbency | Enzyme activity (unit/ml.) |
|---|---|---|
| 1.0 | 0.356 | 71 |
| 1.2 | 0.502 | 87 |
| 1.4 | 0.610 | 138 |
| 1.6 | 0.610 | 130 |
| 2.0 | 0.620 | 130 |

Moreover, the amount of ammonium salts used as the nitrogen source in the culture medium with the aforesaid liquified starch can be above 0.2 percent as shown in table 5.

In order to obtain an enzyme with high activity, the pH of the culture fluid should be kept above 5 during the culture.

Accordingly, when operating according to the present method, the pH of the culture fluid during the culture is kept above 5 by increasing the concentration of phosphate in the culture field, which phosphate acts as buffer, or, in addition, by the addition of alkaline materials, as, for example, NaOH, (NH₄)₂CO3, Na₂CO₃, CaCO₃ etc., to the culture fluid at the beginning period of the culture or during the culture.

For example, following the method of experiment 1, the addition of 0.5 percent by weight of calcium carbonate to the culture fluid at the beginning period of the culture and the addition of sodium hydroxide to the culture fluid during the culture were compared with respect to their enzyme activities after 48 hours from the start of the culture. The results are as following table 8.

Relations between an adjustment of pH with alkali and enzyme activity

| Alkali used | Absorbency | pH | Enzyme activity (unit/ml.) |
|---|---|---|---|
| CaCO₃ | 0.520 | 7.40 | 79 |
| NaOH | 0.480 | 7.20 | 190 |

Further, the culture fluid to be cultured was subjected to a culturing test in a jar fermenter. As the result, it was ascertained that the culture to produce isoamylase was greatly affected by aeration and that the volume of air for aeration found suitable was a quarter of the culture fluid used.

EXAMPLE 1

A streak culture medium composed of

| | |
|---|---|
| Peptone | 1.0% |
| Yeast extract | 0.5% |
| $MgSO_4 \cdot H_2O$ | 0.05% |
| KCl | 0.05% |
| $FeSO_4 \cdot H_2O$ | 0.001% |
| Maltose | 1.0% | is inoculated with *Aerobacter aerogenes* and the strain is engaged in a preliminary culture at 30° C. for 20 hours. Then one platinum loop of the slope culture was inoculated into a liquid medium, sterilized as usual, which medium was composed of

| | |
|---|---|
| $(NH_4)_2SO_4$ | 0.4% |
| $K_2HPO_4$ | 0.7% |
| $KH_2PO_4$ | 0.3% |
| $Mg SO_4 \cdot 7H_2O$ | 0.05% |
| KCl | 0.05% |
| $Fe_2SO_4 \cdot 7H_2O$ | 0.001% |
| liquefied starch (D.E.—7.2) | 1.4% | and was cultured under the conditions of pH 5-7 at 30° C. for 48 hours. The activity of the resulting isoamylase obtained was 138 units/ml.

EXAMPLE 2

Following the method of example 1, sodium hydroxide was added to the liquid medium during the culture and cultured under a pH of 5-7 for 48 hours. The activity of the resulting isoamylase obtained was 190 units/ml.

The liquefied starch that can be used in this invention may be either acid-liquefied starch or enzyme liquefied starch which may be prepared by known methods in the field of starch conversion. When used in the claims, the term "liquefied starch" accordingly is meant to refer to either acid-liquefied starch or enzyme-liquefied starch. For example, an acid-liquefied starch may be prepared by pouring an aqueous starch solution containing 0.3 percent of oxalic acid into boiling water and heating for 10 minutes at 2 atmospheric pressure.

What is claimed is:

1. In a process for the production of isoamylase by the culture of a strain of *Aeorbacter aerogenes* to produce and accumulate isoamylase in a culture medium, the improvement which comprises adding liquefied starch of D.E about 5-10 as a carbon source and ammonium salt as a nitrogen source to the culture medium.

2. In a process for the production of isoamylase by the culture of a strain of *Aerobacter aerogenes* to produce and accumulate isoamylase in a culture medium, the improvement which comprises adding 1-30 percent liquefied starch of D.E. 5-10 as carbon source and more than 0.2 percent of a nitrogen source selected from the group consisting of ammonium nitrate, ammonium sulfate, ammonium phosphate, ammonium chloride and ammonium acetate, to the culture medium and maintaining a pH of the culture medium above 5 during the culture.

* * * * *

UNITED STATES PATENT OFFICE
CERTIFICATE OF CORRECTION

Patent No. 3,622,460             Dated Nov. 23, 1971

Inventor(s)  Kazuo MASUDA et al.

It is certified that error appears in the above-identified patent and that said Letters Patent are hereby corrected as shown below:

Column 1, line 49 (Table 1) "$MgSO_4H_2O$" should read --$MgSO_4 7H_2O$--

Column 3, line 53, delete "slats" and insert --salts--

Column 5, line 12, delete "$MgSO_4H_2O$" and insert --$MgSO_4 7H_2O$--

Signed and sealed this 13th day of June 1972.

(SEAL)
Attest:

EDWARD M. FLETCHER, JR.          ROBERT GOTTSCHALK
Attesting Officer                Commissioner of Patents